United States Patent
Ton-That

(10) Patent No.: US 11,093,632 B1
(45) Date of Patent: Aug. 17, 2021

(54) FILTER FOR SENSITIVE DATA

(71) Applicant: The Travelers Indemnity Company, Hartford, CT (US)

(72) Inventor: Hoa Ton-That, Glastonbury, CT (US)

(73) Assignee: THE TRAVELERS INDEMNITY COMPANY, Hartford, CT (US)

(*) Notice: Subject to any disclaimer, the term of this patent is extended or adjusted under 35 U.S.C. 154(b) by 332 days.

(21) Appl. No.: 16/214,330

(22) Filed: Dec. 10, 2018

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC .................................................. G06F 21/6218
See application file for complete search history.

(56) References Cited

U.S. PATENT DOCUMENTS

| | | | | |
|---|---|---|---|---|
| 6,377,688 B1* | 4/2002 | Numao | ............... | H04L 9/302 380/30 |
| 6,385,727 B1* | 5/2002 | Cassagnol | ............... | G06F 21/10 380/259 |
| 7,864,952 B2* | 1/2011 | Pauker | ............... | H04L 9/0625 380/28 |
| 7,953,987 B2* | 5/2011 | Buscaglia | ............... | G06F 21/86 713/194 |
| 9,003,542 B1* | 4/2015 | MacKay | ............... | G06F 21/50 726/26 |
| 9,141,659 B1 | 9/2015 | Middleman | | |
| 9,223,824 B1 | 12/2015 | Middleman | | |
| 9,418,384 B1 | 8/2016 | Middleman | | |
| 9,659,187 B1 | 5/2017 | Middleman | | |
| 9,767,316 B1 | 9/2017 | Middleman | | |
| 9,898,622 B1 | 2/2018 | Middleman | | |
| 10,002,639 B1* | 6/2018 | Gaeta | ............... | G10L 15/02 |
| 10,043,037 B1 | 8/2018 | Middleman | | |
| 10,049,227 B1 | 8/2018 | Sampson | | |
| 2003/0210819 A1* | 11/2003 | Spinat | ............... | G06F 16/954 382/201 |
| 2012/0259877 A1* | 10/2012 | Raghunathan | ...... | G06F 21/6254 707/757 |
| 2014/0101734 A1* | 4/2014 | Ronda | ............... | G06F 21/6227 726/5 |
| 2014/0281511 A1* | 9/2014 | Kaushik | ............... | G06F 21/602 713/164 |
| 2015/0074392 A1* | 3/2015 | Boivie | ............... | H04L 63/0428 713/164 |

* cited by examiner

*Primary Examiner* — Simon P Kanaan
(74) *Attorney, Agent, or Firm* — Cantor Colburn LLP

(57) ABSTRACT

A system includes a processing device and memory device to provide a data set to an artificial intelligence filter trained to detect sensitive data based on sensitive data rules and detect one or more sensitive data values in the data set. The one or more sensitive data values are replaced with one or more substitute values in the data set, and the data set is associated with a key value. The data set is sent with the one or more substitute values to a third-party service to obtain a result. The key value associated with the result is identified. The one or more sensitive data values associated with the one or more substitute values are determined based on the key value. The one or more substitute values are replaced with the one or more sensitive data values in combination with a portion of the result to create a modified result.

26 Claims, 12 Drawing Sheets

FILTER FOR SENSITIVE DATA

BACKGROUND

Data processing in a distributed system can include invocation of third-party services through a network or cloud-based environment. Data transmitted to third-party services, which can potentially include personal identifying information and/or confidential data, may be exposed for collection and analysis. Current approaches to protecting sensitive data from exposure include the use of encryption or passwords, which may be effective to reduce risks associated with intercepted data transmissions. However, once the sensitive data is received and unencrypted, the sensitive data may be re-exposed to access and/or use in undesirable ways.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a system for filtering sensitive data is provided. The system may be used for security and network traffic management in a computer network system to filter sensitive data transmitted through a network and includes features that solve multiple Internet-centric problems that are necessarily rooted in computer technology and specifically arise in the realm of computer networks. Embodiments, can detect the transmission of a data set and determine whether the data set includes sensitive data. The sensitive data need not be specifically tagged or identified, as an artificial intelligence filter is trained to detect sensitive data based on a plurality of sensitive data rules. Sensitive data values are replaced with one or more substitute values in the data set prior to sending the data set to a third-party service, which can include transmission across an external network that may not be secure. Upon receiving a result from the third-party service, the substitute values can be replaced with the sensitive data values to create a modified result. Thus, the sensitive data is prevented from being externally transmitted, and the results received can be modified to appear as if the sensitive data was included. Replacement of the original data with similar substitute data may allow advanced data analysis to be carried out without disclosure of the sensitive data. The artificial intelligence filter may also be used to time shift intended data transmissions, for instance, adjusting transmission timing to the third-party service and/or adjusting internal transmission timing back within a secure internal network after modifying the results received from the third-party service.

Figure 1:
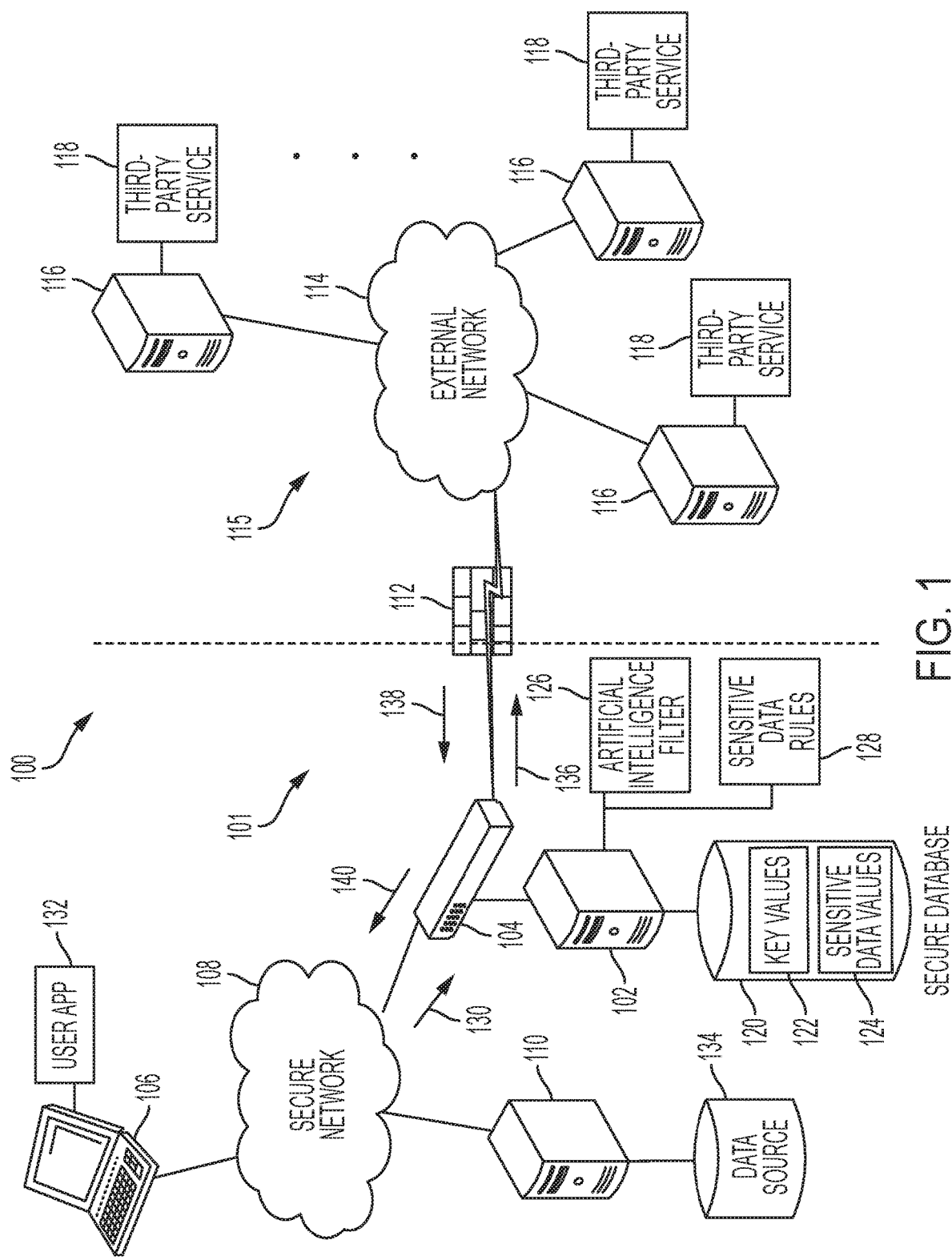
FIG. 1 depicts a block diagram of a system according to some embodiments of the present invention.

Turning now to FIG. 1, a system 100 is depicted upon which sensitive data filtering may be implemented. The system 100 includes a secure network zone 101, which may include a data filtering server 102 coupled to a gateway 104 operable to establish communication with one or more user systems 106, one or more data storage servers 110, and/or other devices (not depicted) through a secure network 108. The gateway 104 may also establish communication to an external network 114, for instance, through a firewall 112, to send and receive data to a plurality of third-party servers 116 in an external network zone 115 that may not be fully secure. The third-party servers 116 can each execute one or more third-party services 118. Examples of third-party services 118 can include, for instance, processing and analytics services that operate on large volumes of data and are implemented by third parties, such as vendors, advisors, brokers, and the like. In embodiments, the secure network zone 101 can include a plurality of networked resources that may be distributed over multiple locations where the networked resources are access-controlled by an enterprise responsible for data management. The external network zone 115 may link to networked resources that are outside of enterprise control and may be distributed over a wide geographic area.

In the example of FIG. 1, the data filtering server 102 is operatively coupled to a secure database 120 that is inaccessible by the third-party services 118. The secure database 120 can include support data, such as key values 122, to assist in identifying data sets or portions of data sets that include sensitive data values 124 and/or support replacement of the sensitive data values 124 with substitute data values in data sets prior to transmission to the third-party services 118. As one example, an artificial intelligence (AI) filter 126 can execute on the data filtering server 102 and monitor for a data set provided 130 from one or more user systems 106 and/or one or more data storage servers 110. The AI filter 126 can be trained to detect sensitive data in a data set based on a plurality of sensitive data rules 128. The sensitive data rules 128 can establish patterns, parameters, templates, models, and/or other definitions of sensitive data to be detected on unstructured text, images, audio, and/or other data formats. The AI filter 126 applies machine learning algorithms to identify various sections/regions of text, image data, and/or audio data as containing sensitive data values 124 that should not be sent to the third-party services 118. Examples of sensitive data values 124 can include personal identification information, confidential data, trade secrets, and other such value types that may be defined through the sensitive data rules 128. The AI filter 126 can learn new types of patterns, variations, and/or rules as new instances of data sets are encountered. For example, classifier functions can determine whether a text pattern is likely sensitive data due to a strong correlation to an existing rule of the sensitive data rules 128.

Examples of algorithms that may be applied to train the AI filter 126 can include one or more of: supervised learning, unsupervised learning, semi-supervised learning, and reinforcement learning. For instance, labeled training data can be provided to train the AI filter 126 to find model parameters that assist in detecting unlabeled data in the data sets. Linear regression and linear classifiers can be used in some embodiments. Other embodiments may use decision trees, k-means, principal component analysis, neural networks, and/or other known machine-learning algorithms. Further, the AI filter 126 may use a combination of machine learning techniques that can differ depending on whether the data set includes unstructured text, image data, and/or audio data. For example, supervised learning with entity extraction can be used to learn text values, while generative adversarial networks can be used for image or audio learning. Memorizing and reconstituting of data can assist the AI filter 126 in learning new patterns.

A user application 132 executed on one or more of the user systems 106 may provide an interface to select data sets to send to the AI filter 126. The data sets can be sent from the user systems 106, or the user systems 106 can identify a data source 134 accessible through data storage servers 110 as a source of records or files as the data sets. In some embodiments, the user application 132 can configure one or more aspects of the AI filter 126 to assist in detection of the sensitive data values 124 and/or constrain parameters used for substitute data values as further described herein. Upon receiving one or more data sets, the AI filter 126 can replace one or more sensitive data values 124 with one or more substitute values for transmission to a third-party service 118. The AI filter 126 can send 136 the data set with the one or more substitute values to a third-party service 118, receive 138 a result associated with the data set from the third-party service 118, and return 140 a modified result, for instance, to a user system 106 or data storage server 110 after replacing the one or more substitute values with the one or more sensitive data values 124 in combination with a portion of the result. For example, the one or more substitute values can be individually located within the result and replaced item-by-item with the one or more sensitive data values 124. Alternatively, a copy of the data set that includes the one or more sensitive data values 124 may be stored, for instance, in the secure database 120, and a data section of the result including the one or more substitute values can be identified and replaced with the copy of the data set that includes the one or more sensitive data values 124. Other substitution and replacement approaches may be used as further alternatives.

In the example of FIG. 1, each of the data filtering server 102, user systems 106, data storage servers 110, and third-party servers 116 can include one or more processors (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100. Although depicted separately, one or more of the data filtering server 102, user systems 106, and/or data storage servers 110 can be combined or further subdivided.

The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 are operated by creators or users of sensitive data. It will be understood that while only a single instance of the user systems 106 is shown in FIG. 1, there may be multiple user systems 106 coupled to the secure network 108 in embodiments.

Each of the data filtering server 102, user systems 106, data storage servers 110, and third-party servers 116 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

Figure 2:
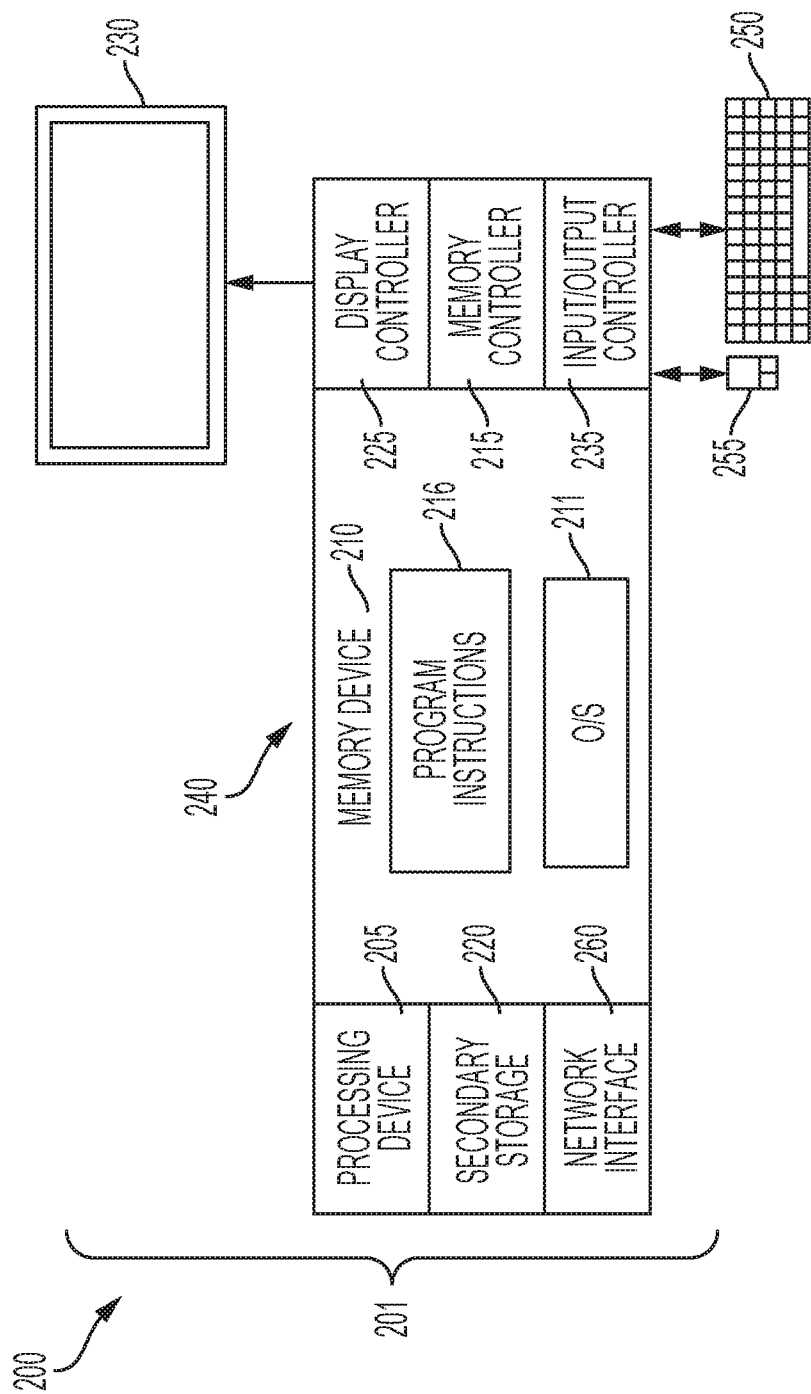
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the data filtering server 102, user systems 106, data storage servers 110, and/or third-party servers 116 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the third-party services 118, AI filter 126, and/or user application 132 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106 of FIG. 1, the network interface 260 can establish communication channels with at least one of the data filtering server 102 or data storage servers 110 via the secure network 108 and/or with third-party servers 116 via external network 114.

Figure 3:
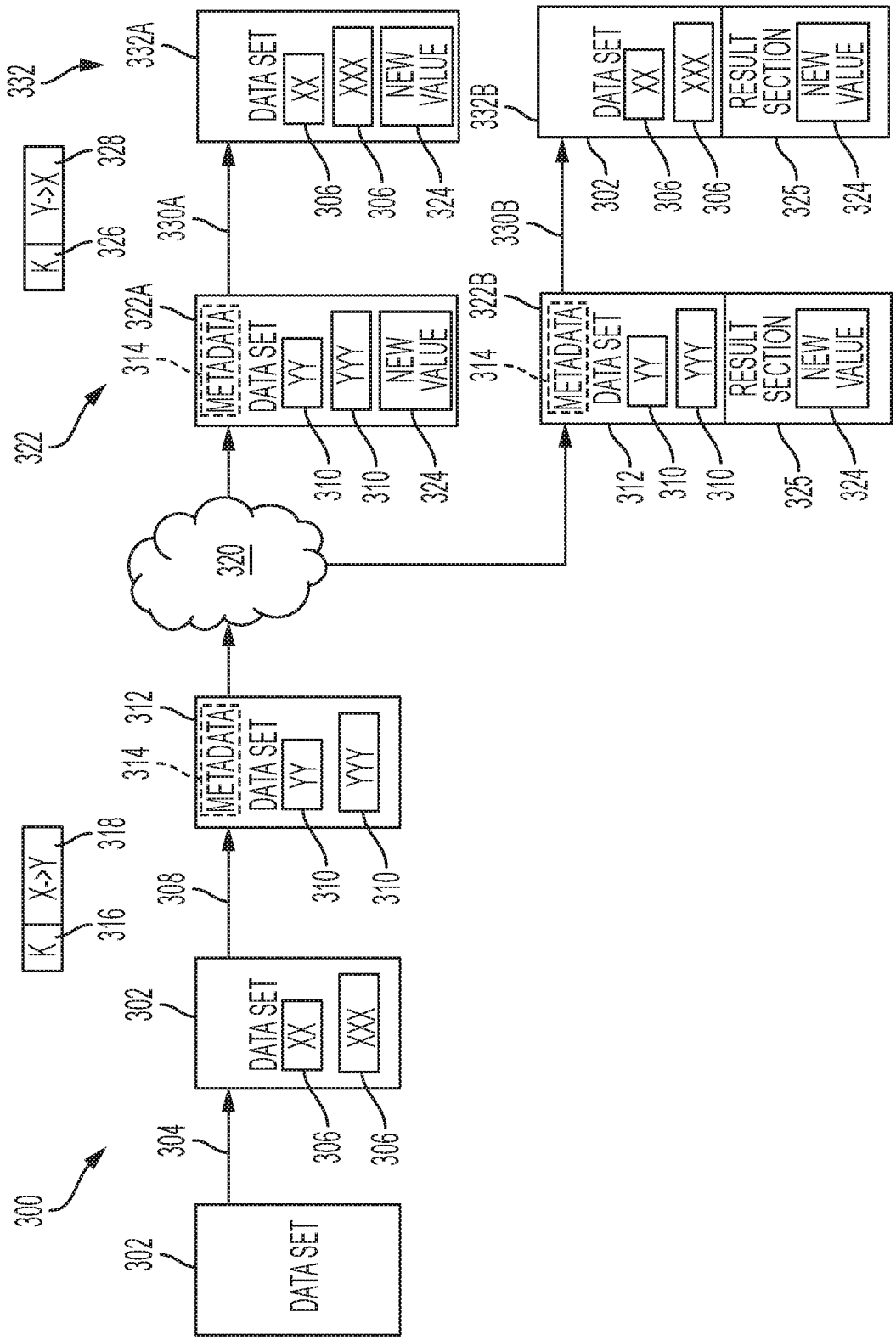
FIG. 3 depicts a data set modification sequence according to some embodiments of the present invention.

FIG. 3 depicts an example of a data set modification sequence 300 according to some embodiments. The data set modification sequence 300 includes analyzing a data set 302 to detect 304 one or more sensitive data values 306 in the data set 302. The one or more sensitive data values 306 are replaced 308 with one or more substitute values 310 in a modified data set 312. Metadata 314 can be attached to the modified data set 312, for instance, in a header to assist with matching a key value 316 with a mapping 318 between sensitive and substitute values. Processing 320 by the third-party service 118 can include augmenting the modified data set 312 as a result 322A, which can include the one or more substitute values 310 and one or more new values 324. As another embodiment, a result 322B from the processing by the third-party service 118 can include adding the one or more new values 324 in a designated partition, such as a result section 325, such that the modified data set 312 is isolated in a data section of the result 322B separate from the result section 325. For instance, the result 322B can be in the form of an extensible mark-up language (XML) file or a JavaScript object notation (JSON) file that partitions a source data section from the result section 325. The result 322A and 322B may be referred to generally as result 322. In some embodiments, the result 322 can also include the metadata 314 which may be decoded to identify an associated key value 326 and mapping 328 to the sensitive data values 306. Replacing 330A the one or more substitute values 310 with the one or more sensitive data values 306 can be performed such that a modified result 332A includes a combination of the one or more sensitive data values 306 and the one or more new values 324. The replacing 330A can include value specific replacement, where the AI filter 126 of FIG. 1 searches for the one or more substitute values 310 in the result 322A, removes the one or more substitute values 310 from the result 322A, and inserts the one or more sensitive data values 306 into the result 322A to create the modified result 332A. As an alternative, the modified data set 312 can be replaced 330B based on identifying a data section of the result 322B including the one or more substitute values 310 and substituting content of the data section including the one or more substitute values 310 with a copy of the data set 302 including the one or more sensitive data values 306 to create a modified result 332B while retaining the result section 325 with the one or more new values 324. Replacement 330A can be used to reduce data storage requirements, as the secure database 120 of FIG. 1 does not need to retain a full copy of the data set 302 when selective value replacement is performed to restore the one or more sensitive data values 306 in place of the one or more substitute values 310 in the modified result 332A. Replacement 330B can be used to reduce searching time, as the AI filter 126 does not need to specifically search for the one or more substitute values 310, where a complete copy of the data set 302 that includes the one or more sensitive data values 306 is substituted into the data section of the result 322B to create the modified result 332B.

Figure 4:
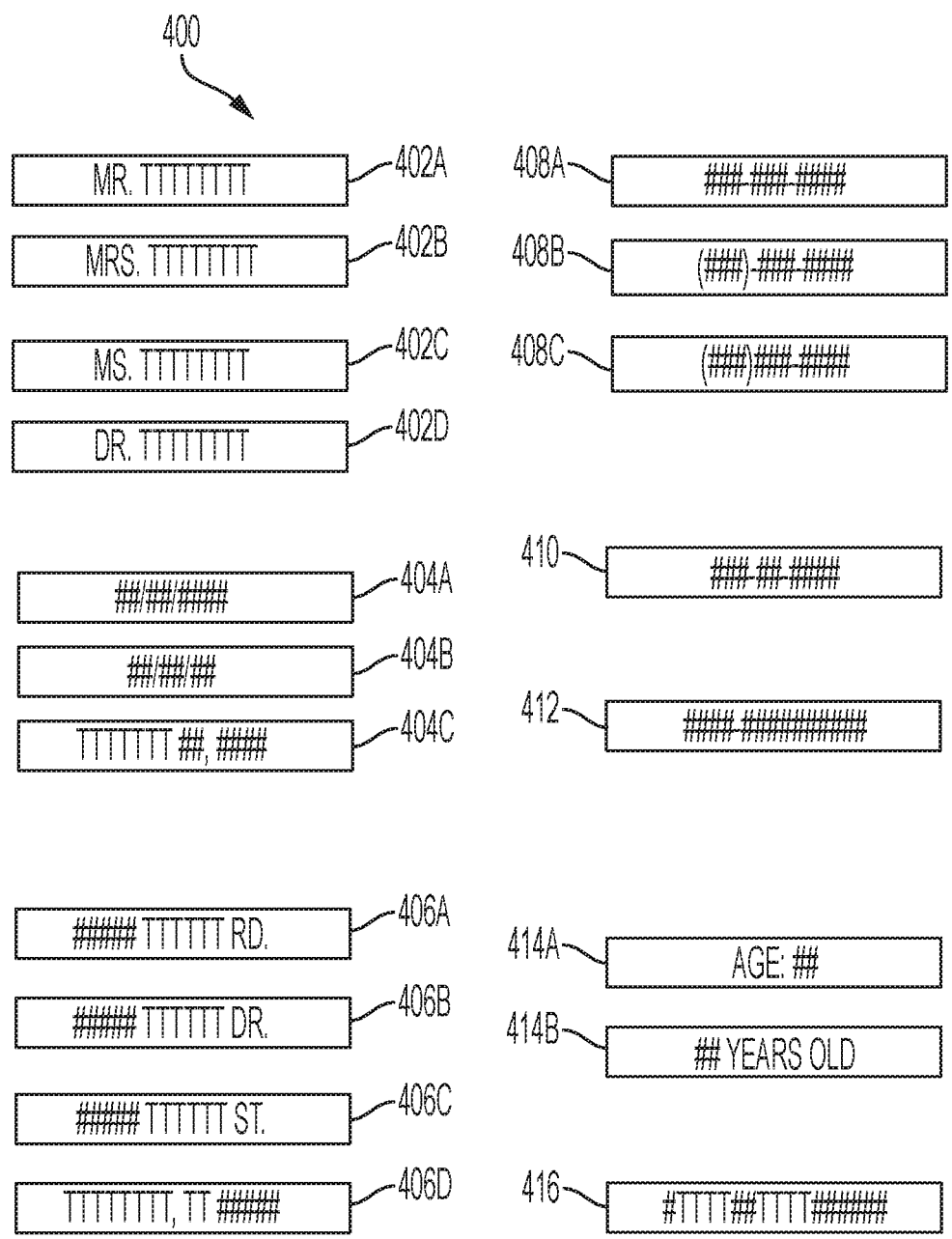
FIG. 4 depicts a plurality of data type patterns according to some embodiments of the present invention.

FIG. 4 depicts a plurality of data type patterns 400 according to embodiments. The data type patterns 400 illustrate examples of patterns for sensitive data that can be learned as part of the sensitive data rules 128. For example, the data type patterns 400 can include name patterns 402A, 402B, 402C, 402D (e.g., "MR.", "MRS.", "MS.", "DR." followed by name text) that can be used for replacing name pattern data with a replacement name. As further variations are observed, such as "Mr.", "Mister", "Miss", and "Doctor", the sensitive data rules 128 can be adapted. Further examples of name patterns 402 may be expanded to include suffixes, such as "Jr.", "Sr.", "Esq.", and the like.

As another example, the data type patterns 400 can include date patterns 404A, 404B, 404C as various identified date formats that may be used for replacing date pattern data with a replacement date. The date patterns 404 may also learn patterns for different variations, such as day-before-month, month-before-day, and two-digit year patterns as the sensitive data rules 128 are adapted.

The data type patterns 400 may also include address patterns 406A, 406B, 406C, 406D as address formats for street and city addresses that can be used for replacing address pattern data with a replacement address. The address patterns 406 can be expanded, for example, to learn other street naming format variations, expanded ZIP Codes, country names, and the like as the sensitive data rules 128 are adapted.

The data type patterns 400 may also include phone number patterns 408A, 408B, 408C that can be used for replacing phone number pattern data with a replacement phone number. The phone number patterns 408 can be expanded, for example, to learn other formats, such as including a leading "1-" pattern or international dialing pattern as the sensitive data rules 128 are adapted.

The data type patterns 400 may also include other patterns such as a social security number pattern 410 for replacing social security pattern data with a replacement social security number, an account number pattern 412 for replacing an account number pattern data with a replacement account number, an age pattern 414A, 414B for replacing age pattern data with a replacement age, a vehicle identification number pattern 416 for replacing vehicle identification number pattern data with a replacement vehicle identification number, and other such patterns.

The example data type patterns 400 of FIG. 4 can be learned by the AI filter 126 of FIG. 1 as part of a learning process and/or the data type patterns 400 may be training patterns that are expanded upon as the AI filter 126 learns new types of patterns and pattern variations. Learning of patterns can be within the context of sentences, phrases, and various word combinations that may be initially tagged to assist in training. For instance, number and word combinations can be examined in groups to identify address patterns. Keywords and phrases can also be used to parse data for patterns, such as "My name is", "Name:", "I was with", "My address is", "I live at", "I'm at", etc. Location information may also be identified using relative terminology rather than precise addresses. For instance, directions, landmarks, and distances are examples of data types that can be learned for sensitive data substitution (e.g., "third driveway on the left", "two blocks from the park", "a half mile past the post office", etc.).

Figure 5:
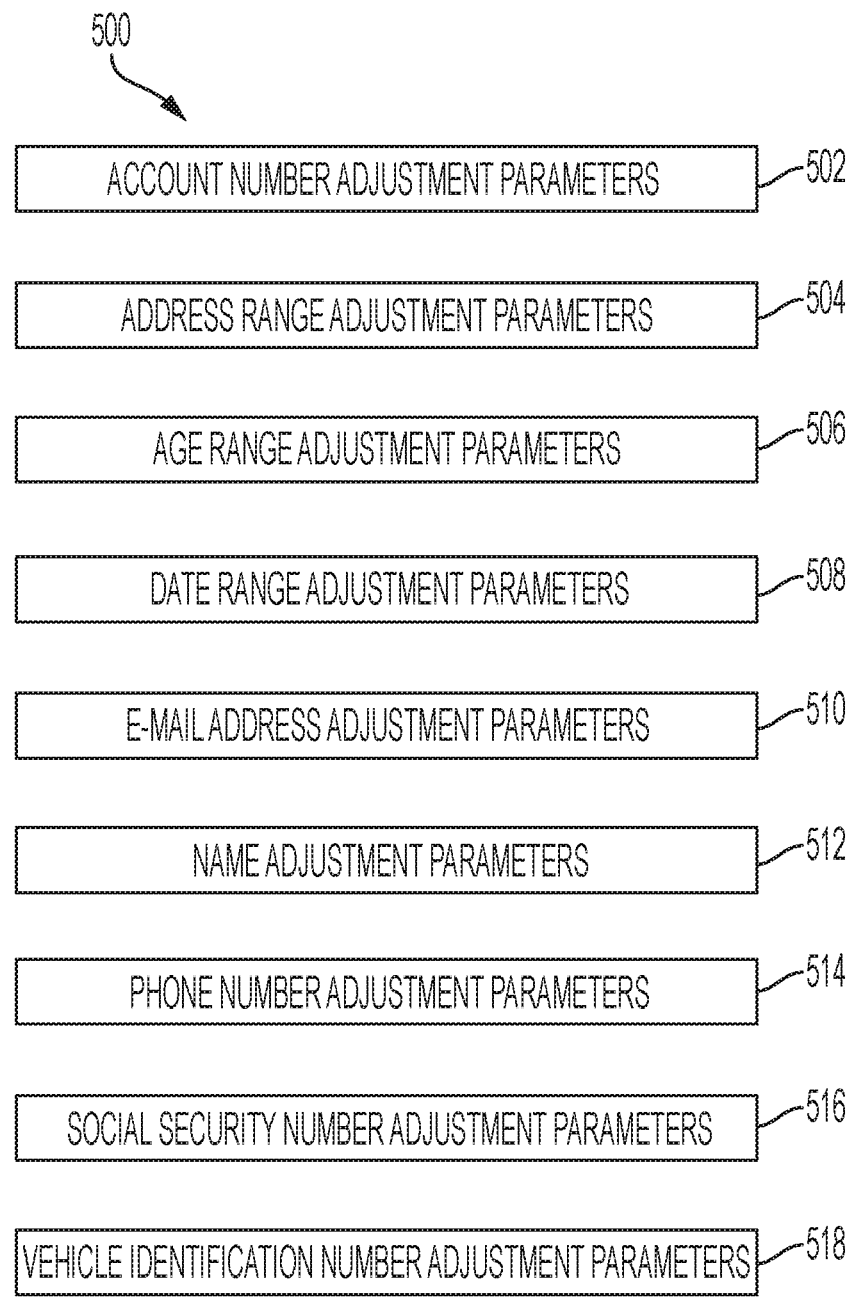
FIG. 5 depicts a plurality of adjustment parameters according to some embodiments of the present invention.

FIG. 5 depicts a plurality of adjustment parameters 500 according to embodiments. The adjustment parameters 500 can define a range of acceptable replacement options for different types of data such that general relationships are maintained, but personal identifying information is masked. For example, account number adjustment parameters 502 can define validity rules for an account number format, such as valid ranges, internal checksums, geographic encoding, and the like such that substitute values for replacing an account number can be defined. Address range adjustment parameters 504 can define a geographic range within which to select a substitute value, such as a different street address in a same town/city, a different city within a same state, or within a multi-state region. Age range adjustment parameters 506 can define an age range band for selecting substitute values, such as within a one-year age band, a five-year age band, a ten-year age band, and other such variations. Date range adjustment parameters 508 can define whether to select substitution values within a same month, a same year, a range of years, or other such options. E-mail address adjustment parameters 510 can provide, for instance, a valid domain name with an invalid user identifier. Name adjustment parameters 512 can define constraints as to whether a generic name of a same gender should be used for a substitution value or a name should be selected from a list of names, for example. Further, for name substitution, name ethnicity retention may be a configurable parameter, for instance, in applications where ethnicity bias is of concern. One or more name lists with ethnicity values can be used to look up an identified name, with name substitution candidates filtered by ethnicity and/or gender. In some embodiments, age range adjustments can be correlated with name adjustments to filter for names having a greater popularity with similar age demographics. As an example, the female name "Mildred" was in the top-ten most popular names for female babies born in the early 1900s but has been one of the least popular baby names since the 1970s. Phone number adjustment parameters 514 can define whether a same area code should be maintained and other such constraints. Social security number adjustment parameters 516 can define whether geographic encoding information should be retained and/or other similar constraints should be applied. Vehicle identification number adjustment parameters 518 can define whether any similar vehicle data should be retained, such as manufacturer, model year, assembly plant, engine type, and/or other encoding values.

Figure 6:
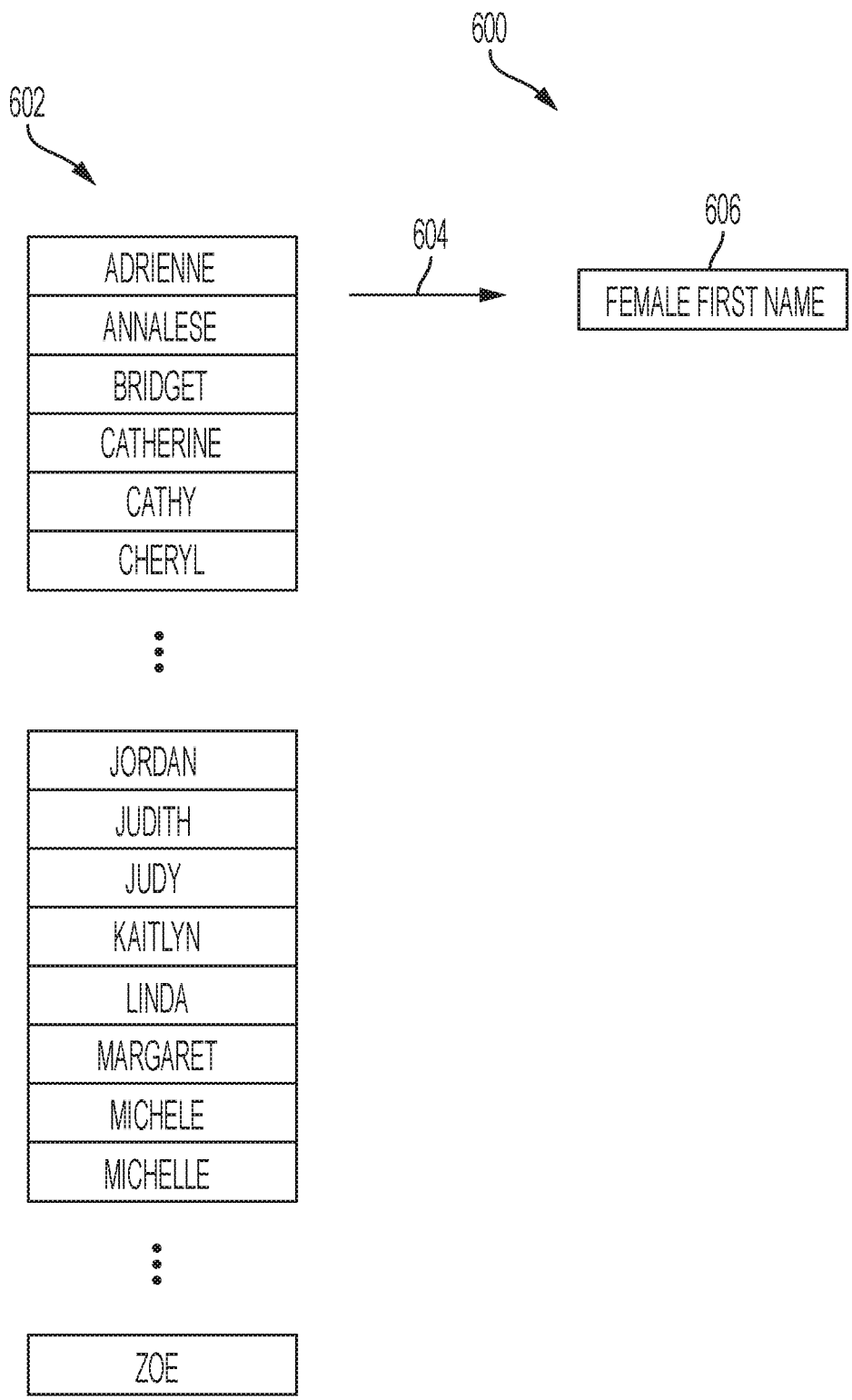
FIG. 6 depicts a substitution table according to some embodiments of the present invention.

FIG. 6 depicts a substitution table selection process 600 according to some embodiments. The substitution table selection process 600 is an example of a substitution process that can be performed by the AI filter 126 of FIG. 1. As one example of name substitution that can be selected through the name adjustment parameters 512 of FIG. 5, when substitution is selected as table-based, a selection 604 of a name, such as a female first name 606, can be performed from a substitution table 602 that includes a plurality of female first names in the example of FIG. 6. The selection 604 can be random or pseudo-random such that a consistent and predictable replacement value is not always selected. The selection 604 can be captured or encoded in the key values 122 of FIG. 1 with an original value of the female first name 606 captured in the sensitive data values 124 prior to performing the substitution table selection process 600. The values in the substitution table 602 may have other associated fields (not depicted), such as one or more ethnicity categories, one or more age range categories, and other such parameters to assist in further filtering name substitution options depending on selections of the adjustment parameters 500 of FIG. 5, for instance. The substitution table 602 may also include variations in name formalism, such as "Judith" and "Judy", and variations in name spelling such as "Michele" and "Michelle". In some applications, it may be preferable to incorporate names having a similar level of popularity for a same age group, while other applications may be agnostic to factors such as name popularity, ethnicity, and formalisms. Further, some applications may prefer to intentionally shift an age, gender, and/or ethnicity in a substitution, for instance, in bias-based testing applications.

Figure 7:
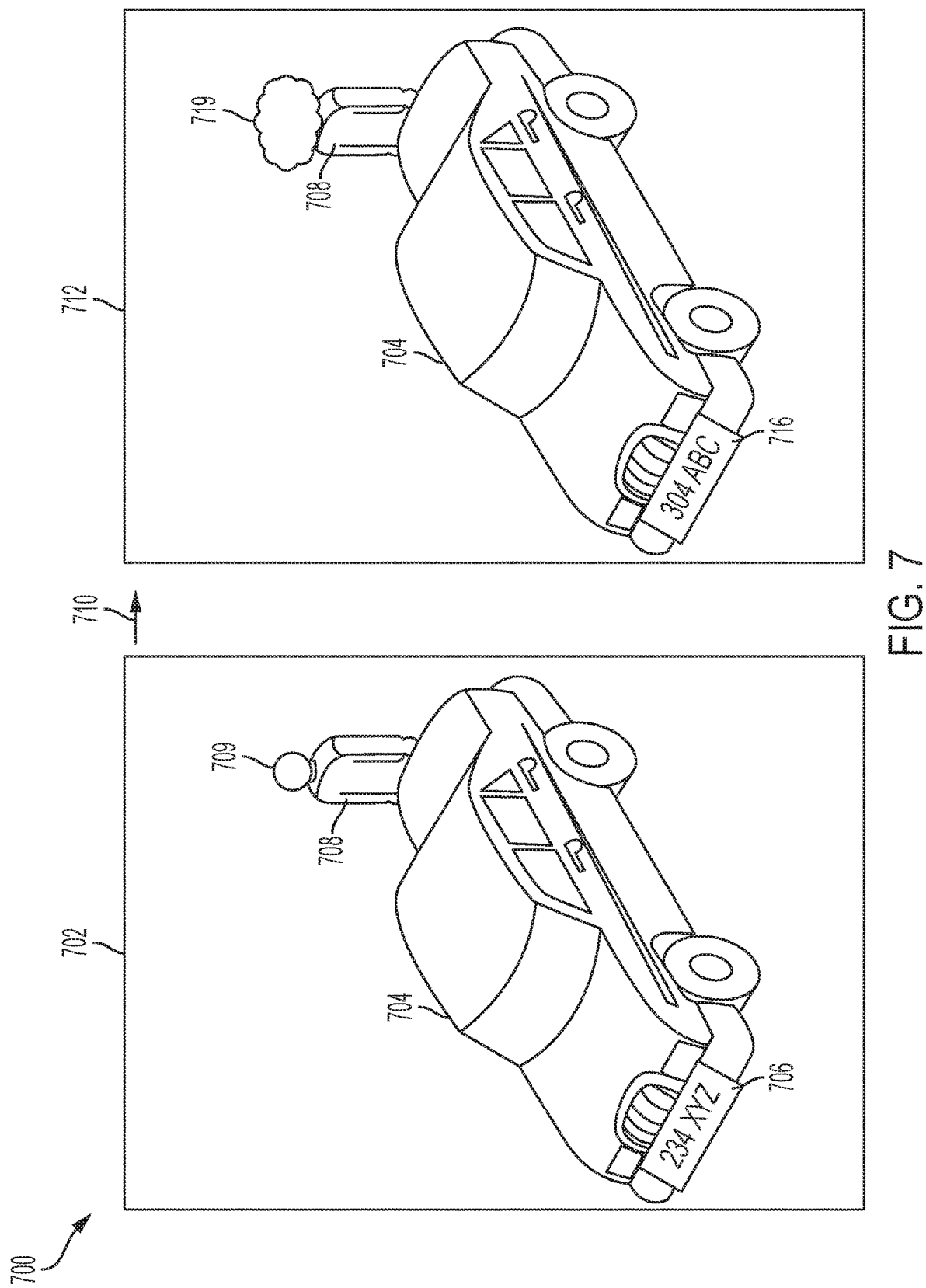
FIG. 7 depicts an image data modification according to some embodiments of the present invention.

FIG. 7 depicts an image data modification 700 according to some embodiments. The image data modification 700 is another example of a substitution that can be performed, for instance, by the AI filter 126 of FIG. 1. In the example of FIG. 7, a data set includes an image 702. The AI filter 126 can perform an image analysis to identify and/or classify one or more regions of the image 702 as containing sensitive data, such as faces or identification information. In the example of FIG. 7, the AI filter 126 may identify a vehicle 704 having a license plate region 706 with alpha-numeric values. The AI filter 126 may also identify a person 708 including a facial region 709. Image adjustment parameters may be accessed to determine a type of substitution to be performed, such as blurring/obscuring or replacement. An image data substitution process 710 can be performed by the AI filter 126, for example, to create a modified image 712 as a data set with substitute values, such as replacing one or more characters in the license plate region 706 with a substitute license plate region 716, and/or obscuring the facial region 709 as a substitute facial region 719. Substitution of image data can be performed using a library of replacement images, while obscuring may be performed through applying a distortion filter to distort image data within a region. Unlike typical image blurring or redaction approaches, the image data substitution process 710 is reversible. For instance, original values of the image 702 of the license plate region 706 and the facial region 709 can be retained in the sensitive data values 124 of FIG. 1 along with substitution information in the key values 122 of FIG. 1 (e.g., image identification information, replacement data coordinates, distortion filter parameters, etc.). Where substitution is performed on image data, there can be additional processing to match scaling, illumination levels, angular shifts, and the like when integrating substitute image data to create the modified image 712. For instance, where replacement images are used, image selection and further processing may be applied to match features such as gender, ethnicity, age, height, a direction of gaze, facial expression, and other such factors. Further identifying features that can be obscured or substituted on images of people may include tattoos, logos/pictures on clothing, hair, facial hair, glasses, and other such features. Skin color blurring may be performed on images of people to obscure tattoos, birthmarks, and other such features.

Figure 8:
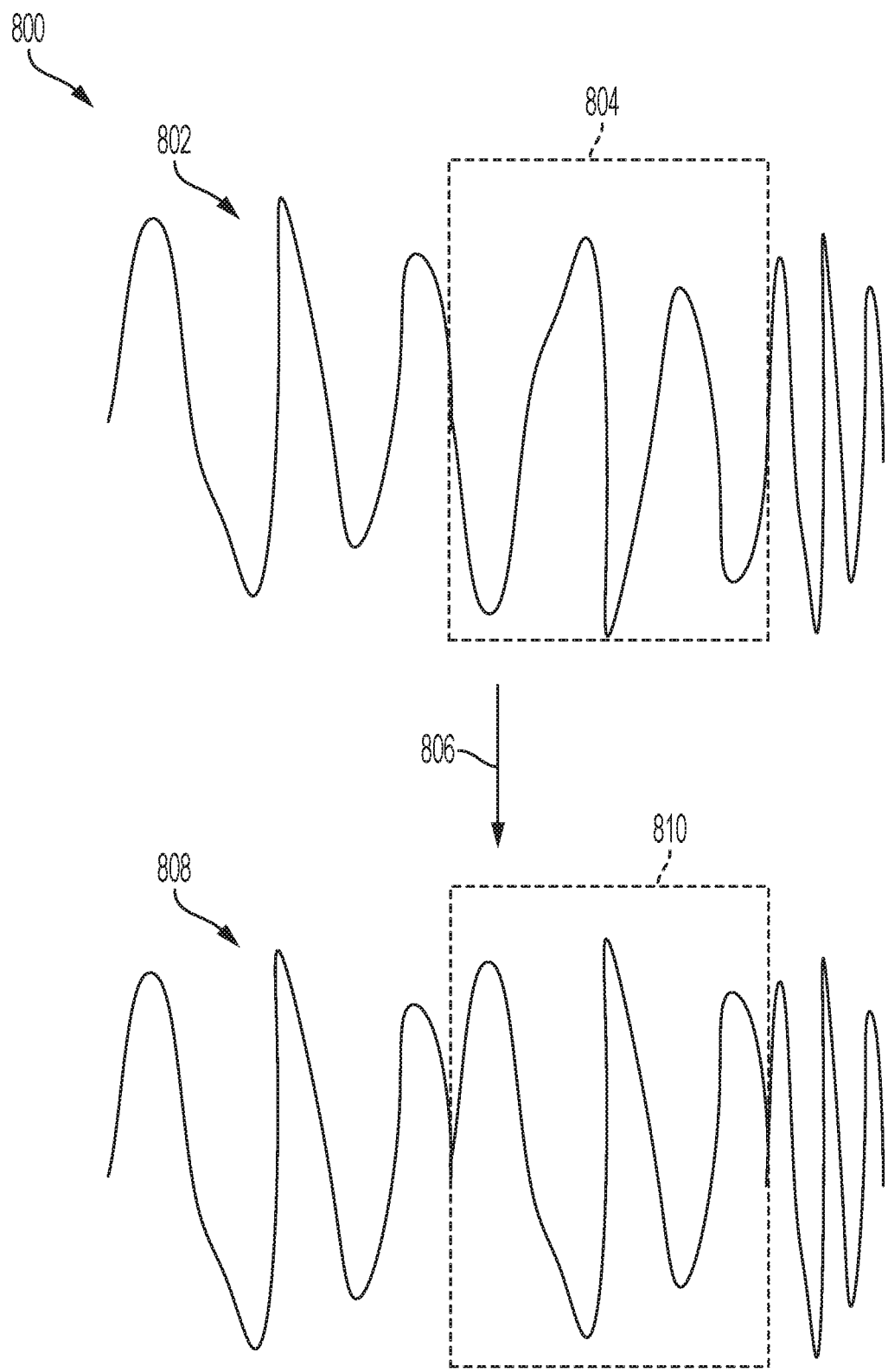
FIG. 8 depicts an audio data modification according to some embodiments of the present invention.

FIG. 8 depicts an audio data modification 800 according to some embodiments. When a data set includes audio data, the AI filter 126 of FIG. 1 can analyze the audio data to search for sensitive data that may be defined as personal identifying information or other such information. In the example of FIG. 8, an audio snippet 802 can include sensitive data values 804, such as a name, an address, a phone number, an account number, and other such types of sensitive data as previously described. The AI filter 126 can perform an audio substitution process 806 to produce a modified audio snippet 808 with one or more substitute values 810. In some embodiments, the audio substitution process 806 applies a distortion filter to distort audio data within the audio snippet 802 to obscure the sensitive data values 804 in producing the one or more substitute values 810 of the modified audio snippet 808. For example, the distortion can include amplitude, phase, and/or frequency adjustments, noise overlays, and the like. In some embodiments, the audio distortion can include one or more tones or muting of the one or more substitute values 810. In embodiments where audio synthesis is available, the one or more substitute values 810 can be replacement audio that is adjusted, for example, according to the adjustment parameters 500 of FIG. 5. In some embodiments, the AI filter 126 can use an audio-to-text conversion to search sensitive data and map the resulting text to time values within the audio data. Existing audio clips or audio synthesis can be used to generate the substitute values. Alternatively, audio synthesis can be used to replace audio data including unmodified portions and substitution values such that the substitution values are more difficult to identify within the modified audio data. Similar to the image processing example of FIG. 7, the audio substitution process 806 can be reversible. Audio data including the sensitive data values 804 can be stored in the sensitive data values 124 of FIG. 1 along with substitution information in the key values 122 of FIG. 1 (e.g., audio identification information, replacement times, distortion filter parameters, etc.). Additional processing can be performed to better integrate substitute audio values, such as voice type matching of volume, gender, ethnicity, cadence, accent, and the like. In some embodiments, voice recordings can be processed to remove accents and/or normalize features such as volume and cadence.

Figure 9:
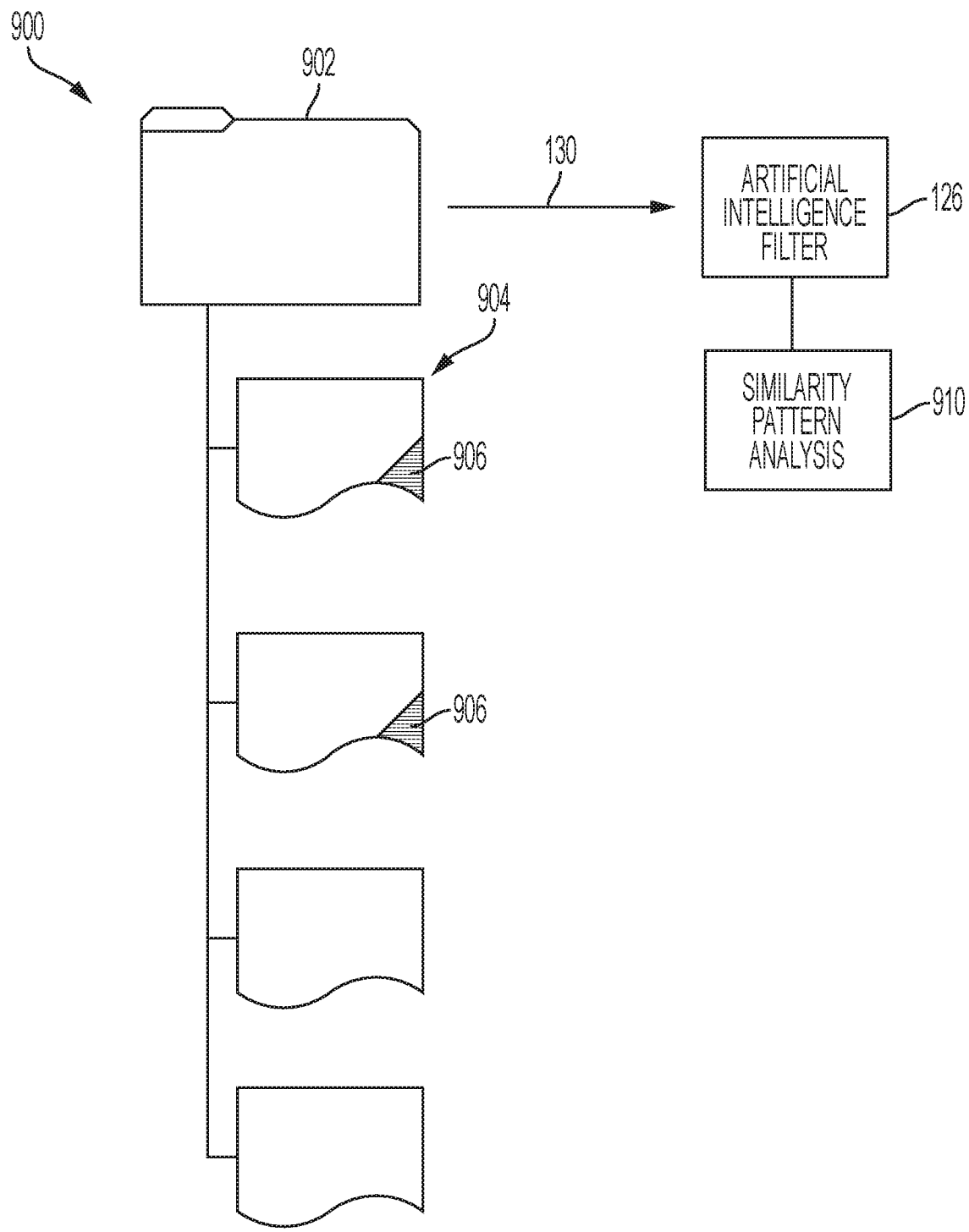
FIG. 9 depicts a multiple data element substitution according to some embodiments of the present invention.

FIG. 9 depicts a multiple data element substitution 900 according to some embodiments. As one example, a file system 902 of the data source 134 of FIG. 1 can include a plurality of records 904, which may each be a file or a portion of a file. A user may select 906 one or more of the records 904, for instance, through the user application 132 of FIG. 1, as the data set 302 of FIG. 3. The records 904 as selected 906 can be provided 130 to the AI filter 126 of FIG. 1. The AI filter 126 can use a similarity pattern analysis 910 to identify one or more data similarity patterns in one or more sensitive data values across the plurality of records 904. For example, if there are one-thousand records 904 that include gender information with 64% female and 36% male records, the similarity pattern analysis 910 may further examine distributions of other parameters, such as age, location, assets, and the like to identify the distributions for the AI filter 126 and assist in maintaining similar distributions in the substitute values, (e.g., of the 64% female records: 25% of females having an age of 16-25 years old, 35% of females having an age of 26-45 years old, and 30% of females having an age of 46+ years old). Constrained adjustments in determining substitute values can assist in maintaining accuracy of various analytics while still protecting personal identifying information contained within the records 904.

Figure 10:
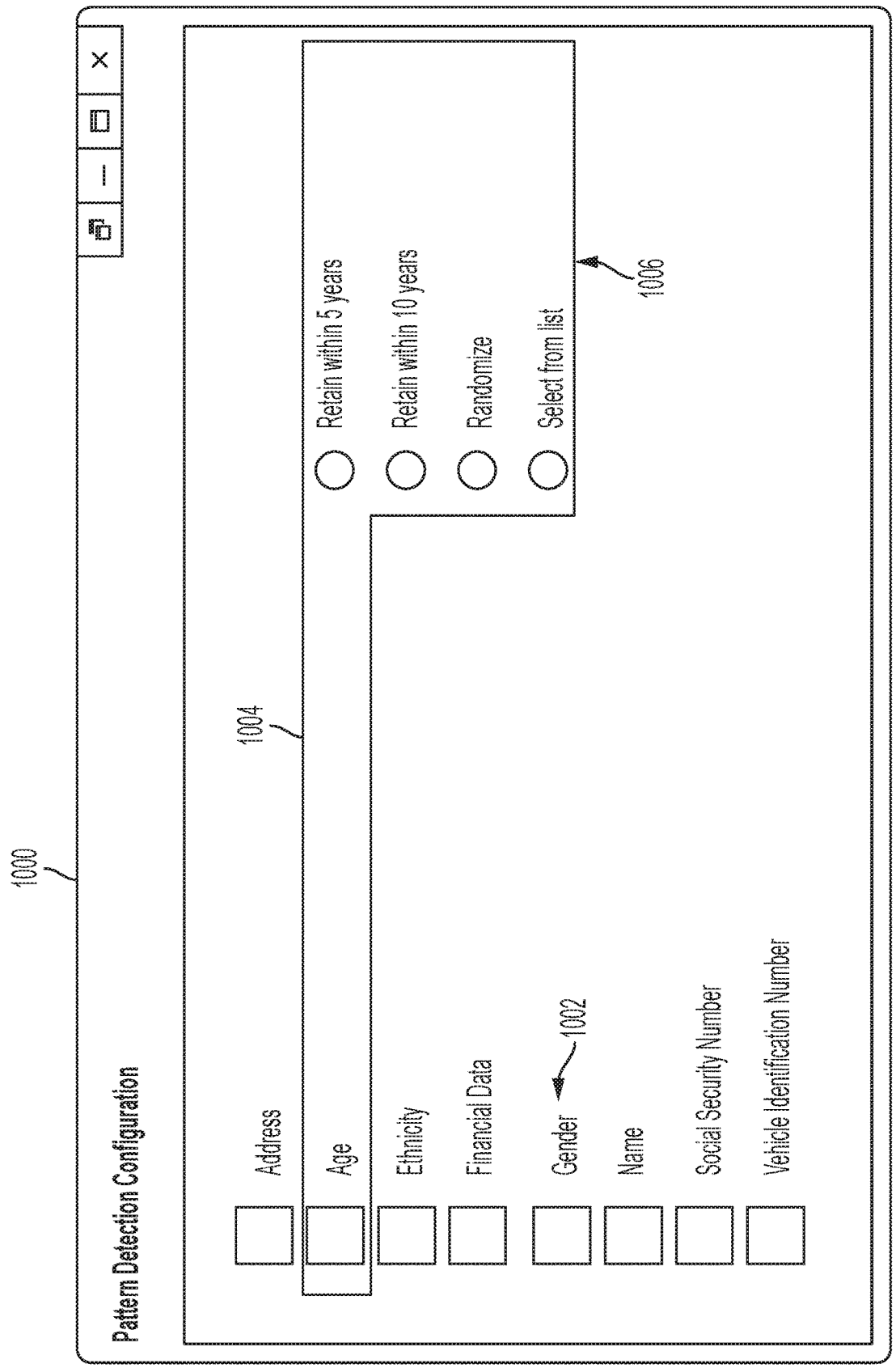
FIG. 10 depicts a user input interface according to some embodiments of the present invention.

FIG. 10 depicts a user input interface 1000 according to some embodiments. In the example of FIG. 10, the user input interface 1000 can be used to configure the types of sensitive data values to detect and substitution preferences. For example, sensitive data types 1002 can be selected to determine whether to search for address data, age data, ethnicity data, financial data, gender data, name data, social security number data, vehicle identification number data, and other such values. Individualized configuration selections 1004 can further define one or more selectable substitution options 1006, such as retaining a value within a predetermined range, randomizing, selecting from a list, and other such substitution options. Selection results may be captured in the sensitive data rules 128 of FIG. 1, data type patterns 400 of FIG. 4, and/or adjustment parameters 500 of FIG. 5. Although one example is depicted in FIG. 10, it will be understood that many variations are contemplated, including additional parameter types, detection pattern definitions, and substitution options, such as text, image, and audio support options. The user input interface 1000 can store values in one or more configuration files accessible by the AI filter 126 of FIG. 1. In some embodiments, configuration files can be manually updated and need not use a graphical user interface, such as the user input interface 1000, to make modifications.

Figure 11A:
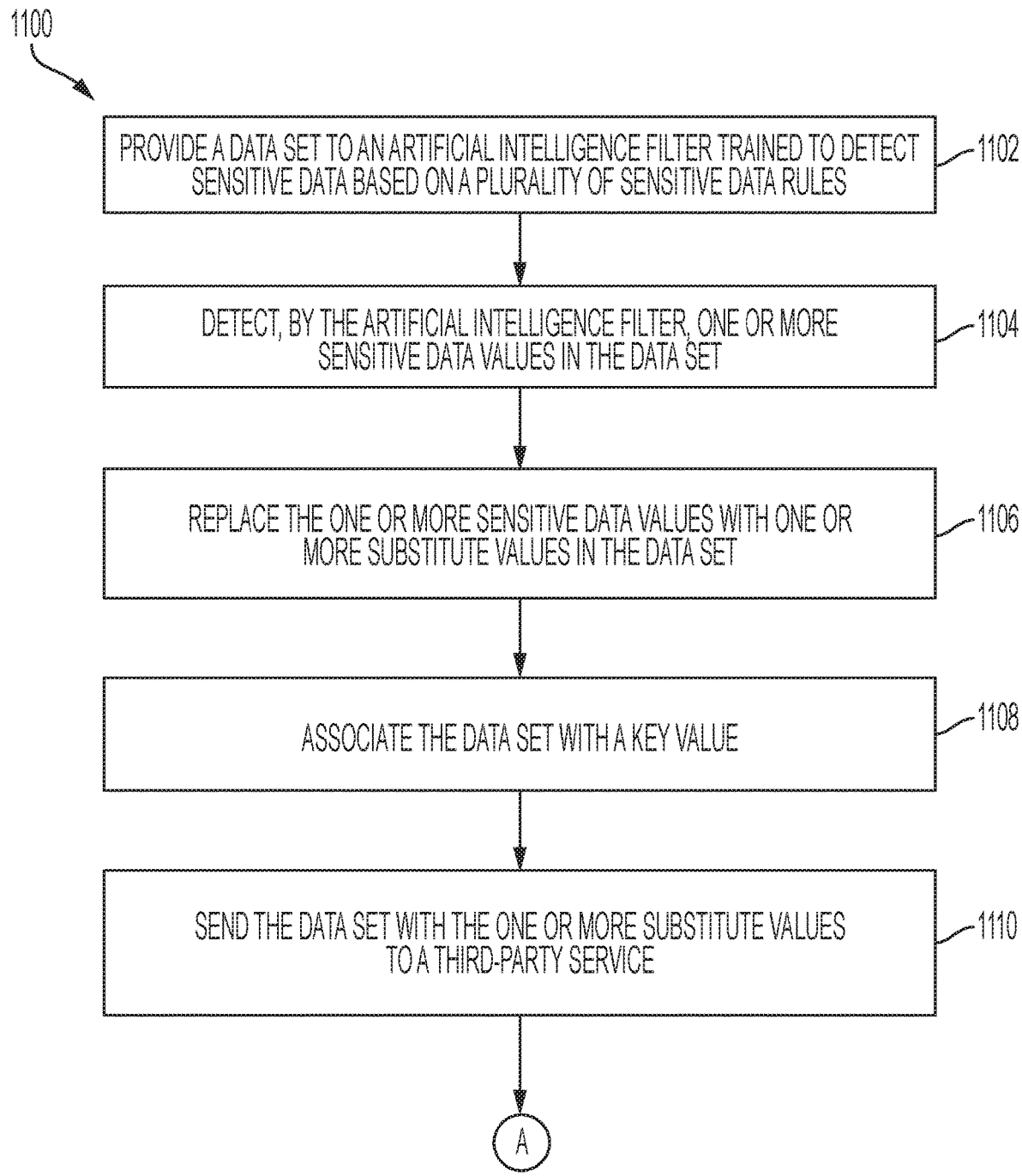
FIGS. 11A and 11B depict a process flow according to some embodiments of the present invention.
Figure 11B:
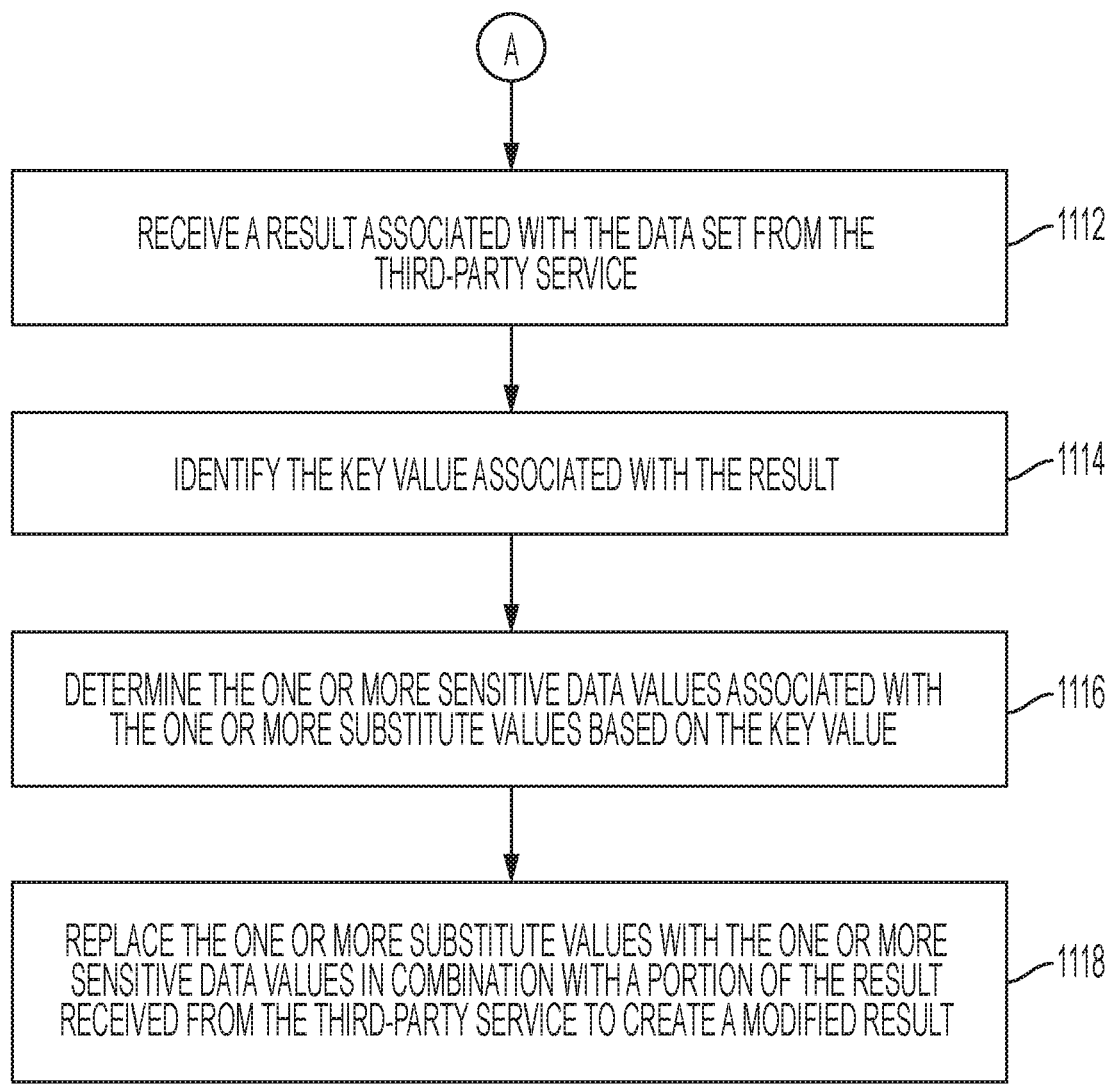

Turning now to FIGS. 11A and 11B, a process flow 1100 is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the data filtering server 102 of FIG. 1 in combination with the one or more user systems 106 and/or the one or more data storage servers 110. The process flow 1100 is described in reference to FIGS. 1-11B.

At step 1102, a data set 302 can be provided 130 to an AI filter 126 trained to detect sensitive data based on a plurality of sensitive data rules 128. The sensitive data can include one or more of: personally identifiable information and confidential information, for example. Examples of confidential information can include credit card numbers, bank account numbers, and other such sensitive information. Other types of sensitive data may include system names, internet protocol (IP) addresses, media access control (MAC) addresses, uniform resource locators, global positioning system (GPS) coordinates, and other such system or device identifiers. The sensitive data rules 128 can include a plurality of patterns, such as data type patterns 400, configured to extract one or more sensitive data values 306 from unstructured text, audio data, and/or image data. The sensitive data rules 128 can be adapted as one or more variation patterns are observed.

At step 1104, the AI filter 126 can detect 304 one or more sensitive data values 306 in the data set 302. The sensitive data values 306 may be logged as sensitive data values 124 in a secure database 120 to support sensitive data restoration after processing is performed by one or more third-party services 118.

At step 1106, the AI filter 126 can replace 308 the one or more sensitive data values 306 with one or more substitute values 310 in the data set 302. The one or more substitute values 310 can include one or more variations of the one or more sensitive data values 306. The one or more substitute values 310 can replace, for example, one or more of: name pattern data with a replacement name, date pattern data with a replacement date, address pattern data with a replacement address, phone number pattern data with a replacement phone number, social security pattern data with a replacement social security number, account number pattern data with a replacement account number, age pattern data with a replacement age, and/or vehicle identification number pattern data with a replacement vehicle identification number. In some embodiments, a range of variation can be detected within a similarity threshold based on a data type of the one or more sensitive data values 306, and the one or more substitute values 310 are selected as one or more values in the range of variation for the data type of the one or more sensitive data values 306. For instance, age data grouped within +/−five year groups can be modified to maintain a similar distribution using different values.

As a further example, the AI filter 126 can identify a data type of the one or more sensitive data values 306, access a substitution table 602 based on the data type, and select one or more values from the substitution table 602 as the one or more substitute values 310 based on the data type. Selection of the one or more values from the substitution table 602 can be performed randomly or pseudo randomly. As another example, replacing the one or more sensitive data values 306 with the one or more substitute values 310 in the data set 302 can include identifying a region 706, 709 within an image file including the one or more sensitive data values 306 and applying a distortion filter to distort image data within the region 706, 709. As a further example, replacing the one or more sensitive data values 306 with the one or more substitute values 310 in the data set 302 can include identifying an audio snippet 802 within an audio file including one or more sensitive data values 804 and applying a distortion filter to distort audio data within the audio snippet 802 to produce a modified audio snippet 808 with one or more substitute values 810.

At step 1108, the AI filter 126 can associate the data set 302 with a key value 316. The key value 316 can be a digital fingerprint (e.g., a unique value) linking the one or more substitute values 310 with the data set 302, for instance, through mapping 318. A digital fingerprint can be formed as a unique value using various methods, such as computing a cyclic redundancy check code, a cryptographic hash function, and/or other fingerprint functions that uniquely identify digital data. A record of the key value 316 and the one or more sensitive data values 306 can be stored in a secure database 120 that is inaccessible by third-party services 118. At step 1110, the data filtering server 102 can send the data set 302 with the one or more substitute values 310 (e.g., modified data set 312) to a third-party service 118.

At step 1112, the data filtering server 102 can receive 138 a result 322 associated with the data set 302 from the third-party service 118. In some embodiments, the key value 316 can be encoded as metadata 314 attached to the data set 302 with the one or more substitute values 310 (e.g., modified data set 312), and the key value 316 encoded as metadata 314 can be extracted from the result 322 received from the third-party service 118.

At step 1114, the AI filter 126 can identify the key value 316 associated with the result 322 (e.g., associated key value 326 as decoded). At step 1116, the AI filter 126 can determine the one or more sensitive data values 306 associated with the one or more substitute values 310 based on the key value 316. For example, the secure database 120 can be accessed to extract the one or more sensitive data values 306 from the stored values of the sensitive data values 124 based on matching the digital fingerprint to the result received from the third-party service 118. Alternatively, the secure database 120 can hold and extract a copy of the data set 302 that included the sensitive data values 306 prior to modifications.

At step 1118, the AI filter 126 can replace the one or more substitute values 310 with the one or more sensitive data values 306 in combination with a portion of the result 322 received from the third-party service 118 to create a modified result 332. As previously described with respect to FIG. 3, the result 322 may be the result 322A (e.g., including one or more new values 324 within the modified data set 312) to create the modified result 332A, the result 322B (e.g., including one or more new values 324 within a result section 325) to create the modified result 332B, or another formatting option (e.g., splitting the result 322 into two or more files). The data filtering server 102 can return 140 the modified result 332 to the user system 106 or data storage server 110 for analysis or storage in the data source 134. The processing performed by the third-party services 118 can reduce the processing and memory requirements within the secure network zone 101, and the filtering performed by the AI filter 126 protects the integrity of sensitive data by preventing the sensitive data from being exposed within the external network zone 115.

In some embodiments, a plurality of records 904 can be passed as the data set 302 to the AI filter 126. One or more data similarity patterns can be identified in the one or more sensitive data values 306 across the plurality of records 904. The one or more data similarity patterns can be maintained in the one or more substitute values 310 across the plurality of records with respect to one or more of: a gender distribution, an age distribution, a location distribution, and an asset distribution.

Technical effects include automated detection and substitution of sensitive data prior to sending a data set containing the sensitive data to a third-party service through an external network. The returned results from the third-party service can be modified to replace substituted data values with sensitive data values to create a complete result set. The process avoids human intervention, delays, and potential accuracy issues that could result from manually redacting data. Further, maintaining key values allows for data recovery that may not be possible where redaction is used.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a processing device; and
   a memory device in communication with the processing device, the memory device storing instructions that when executed by the processing device result in:
   providing a data set to an artificial intelligence filter trained to detect sensitive data based on a plurality of sensitive data rules;
   detecting, by the artificial intelligence filter, one or more sensitive data values in the data set;
   replacing the one or more sensitive data values with one or more substitute values in the data set;
   associating the data set with a key value, wherein the key value is uniquely defined per mapping that links the one or more sensitive data values with the one or more substitute values per data set;
   sending the data set with the one or more substitute values to a third-party service;
   receiving a result associated with the data set from the third-party service;
   identifying the key value associated with the result;
   determining the one or more sensitive data values associated with the one or more substitute values based on the key value; and
   replacing the one or more substitute values with the one or more sensitive data values in combination with a portion of the result received from the third-party service to create a modified result.

2. The system of claim 1, wherein the sensitive data comprises one or more of: personally identifiable information and confidential information.

3. The system of claim 1, wherein the sensitive data rules comprise a plurality of patterns configured to extract the one or more sensitive data values from unstructured text, audio data, or image data.

4. The system of claim 1, further comprising instructions that when executed by the processing device result in:
adapting the sensitive data rules as one or more variation patterns are observed.

5. The system of claim 1, wherein the one or more substitute values comprise one or more variations of the one or more sensitive data values.

6. The system of claim 5, wherein the one or more substitute values replace one or more of: name pattern data with a replacement name, date pattern data with a replacement date, address pattern data with a replacement address, phone number pattern data with a replacement phone number, social security pattern data with a replacement social security number, account number pattern data with a replacement account number, age pattern data with a replacement age, and vehicle identification number pattern data with a replacement vehicle identification number.

7. The system of claim 5, further comprising instructions that when executed by the processing device result in:
determining a range of variation within a similarity threshold based on a data type of the one or more sensitive data values; and
selecting the one or more substitute values as one or more values in the range of variation for the data type of the one or more sensitive data values.

8. The system of claim 1, further comprising instructions that when executed by the processing device result in:
identifying a data type of the one or more sensitive data values;
accessing a substitution table based on the data type; and
selecting one or more values from the substitution table as the one or more substitute values based on the data type.

9. The system of claim 8, wherein selection of the one or more values from the substitution table is performed randomly or pseudo randomly.

10. The system of claim 1, wherein the key value comprises a digital fingerprint linking the one or more substitute values with the data set.

11. The system of claim 10, further comprising instructions that when executed by the processing device result in:
storing a record of the key value and the one or more sensitive data values in a secure database that is inaccessible by the third-party service; and
accessing the secure database to extract the one or more sensitive data values based on matching the digital fingerprint to the result received from the third-party service.

12. The system of claim 1, wherein replacing the one or more sensitive data values with the one or more substitute values in the data set comprises identifying a region within an image file comprising the one or more sensitive data values and applying a distortion filter to distort image data within the region.

13. The system of claim 1, wherein replacing the one or more sensitive data values with the one or more substitute values in the data set comprises identifying an audio snippet within an audio file comprising the one or more sensitive data values and applying a distortion filter to distort audio data within the audio snippet.

14. The system of claim 1, wherein replacing the one or more sensitive data values with the one or more substitute values in the data set comprises maintaining one or more of: a same gender, a same ethnicity, and a same age range.

15. The system of claim 1, further comprising instructions that when executed by the processing device result in:
encoding the key value as metadata;
attaching the metadata to the data set with the one or more substitute values;
extracting the metadata from the result received from the third-party service; and
decoding the metadata to identify the key value and mapping to the one or more sensitive values.

16. The system of claim 1, further comprising instructions that when executed by the processing device result in:
providing a plurality of records as the data set to the artificial intelligence filter;
identifying one or more data similarity patterns in the one or more sensitive data values across the plurality of records; and
maintaining the one or more data similarity patterns in the one or more substitute values across the plurality of records with respect to one or more of: a gender distribution, an age distribution, a location distribution, and an asset distribution.

17. The system of claim 1, wherein replacing the one or more substitute values with the one or more sensitive data values in combination with the portion of the result comprises:
searching for the one or more substitute values in the result;
removing the one or more substitute values from the result; and
inserting the one or more sensitive data values into the result to create the modified result.

18. The system of claim 1, wherein replacing the one or more substitute values with the one or more sensitive data values in combination with the portion of the result comprises:
identifying a data section of the result comprising the one or more substitute values; and
substituting content of the data section comprising the one or more substitute values with a copy of the data set comprising the one or more sensitive data values.

19. A computer program product comprising a storage medium embodied with computer program instructions that when executed by a computer cause the computer to implement:
providing a data set to an artificial intelligence filter trained to detect sensitive data based on a plurality of sensitive data rules;
detecting, by the artificial intelligence filter, one or more sensitive data values in the data set;
replacing the one or more sensitive data values with one or more substitute values in the data set;
associating the data set with a key value, wherein the key value is uniquely defined per mapping that links the one or more sensitive data values with the one or more substitute values per data set;
sending the data set with the one or more substitute values to a third-party service;
receiving a result associated with the data set from the third-party service;
identifying the key value associated with the result;
determining the one or more sensitive data values associated with the one or more substitute values based on the key value; and replacing the one or more substitute values with the one or more sensitive data values in combination with a portion of the result received from the third-party service to create a modified result.

20. The computer program product of claim 19, wherein the sensitive data comprises one or more of: personally identifiable information and confidential information, and the sensitive data rules comprise a plurality of patterns configured to extract the one or more sensitive data values from unstructured text, audio data, or image data.

21. The computer program product of claim 19, further comprising computer program instructions that when executed by the computer cause the computer to implement:
adapting the sensitive data rules as one or more variation patterns are observed.

22. The computer program product of claim 19, wherein the one or more substitute values comprise one or more variations of the one or more sensitive data values, and further comprising computer program instructions that when executed by the computer cause the computer to implement:
determining a range of variation within a similarity threshold based on a data type of the one or more sensitive data values; and
selecting the one or more substitute values as one or more values in the range of variation for the data type of the one or more sensitive data values.

23. The computer program product of claim 19, further comprising computer program instructions that when executed by the computer cause the computer to implement:
identifying a data type of the one or more sensitive data values;
accessing a substitution table based on the data type; and
selecting one or more values from the substitution table as the one or more substitute values based on the data type.

24. The computer program product of claim 19, wherein the key value comprises a digital fingerprint linking the one or more substitute values with the data set, and further comprising computer program instructions that when executed by the computer cause the computer to implement:
storing a record of the key value and the one or more sensitive data values in a secure database that is inaccessible by the third-party service; and
accessing the secure database to extract the one or more sensitive data values based on matching the digital fingerprint to the result received from the third-party service.

25. The computer program product of claim 19, further comprising computer program instructions that when executed by the computer cause the computer to implement:
encoding the key value as metadata;
attaching the metadata to the data set with the one or more substitute values;
extracting the metadata from the result received from the third-party service; and
decoding the metadata to identify the key value and mapping to the one or more sensitive values.

26. The computer program product of claim 19, further comprising computer program instructions that when executed by the computer cause the computer to implement:
providing a plurality of records as the data set to the artificial intelligence filter;
identifying one or more data similarity patterns in the one or more sensitive data values across the plurality of records; and
maintaining the one or more data similarity patterns in the one or more substitute values across the plurality of records with respect to one or more of: a gender distribution, an age distribution, a location distribution, and an asset distribution.

\* \* \* \* \*